Dec. 15, 1953  H. D. FOUNTAIN  2,662,729
POST PULLER
Filed Oct. 10, 1950
FIG. 1.
FIG. 2.
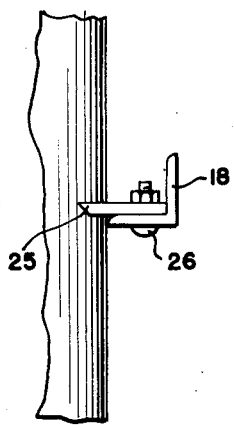
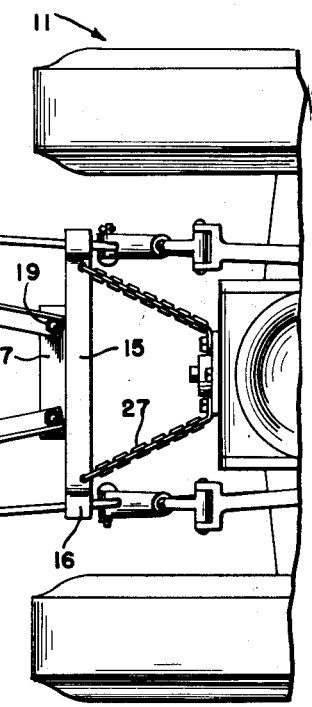
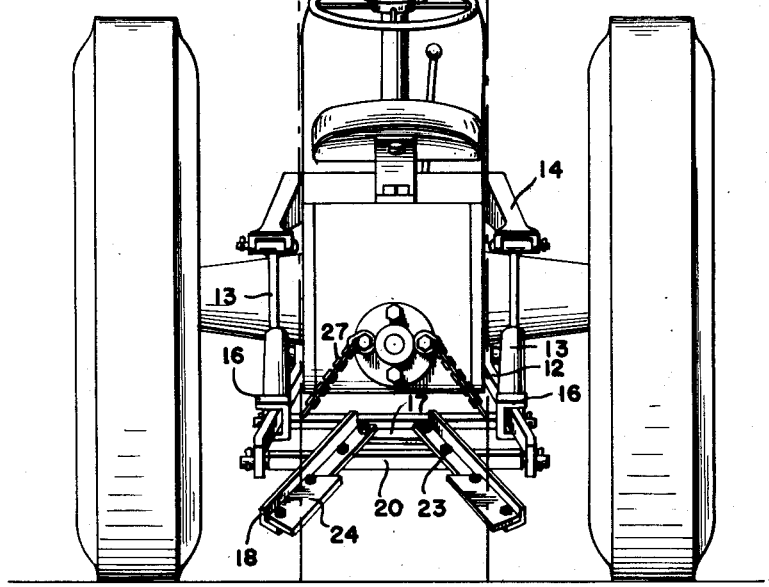
FIG. 3.
*INVENTOR.*
HOWARD D. FOUNTAIN
*BY*

Patented Dec. 15, 1953

2,662,729

UNITED STATES PATENT OFFICE 2,662,729

POST PULLER

Howard D. Fountain, Iowa City, Iowa

Application October 10, 1950, Serial No. 189,443

2 Claims. (Cl. 254—132)

This invention relates to pulling apparatus, and more particularly is directed to a post puller and brush grubber which may be readily incorporated with conventional farm equipment such as tractors, tractor manure loaders, and which can be easily and efficiently operated by one person.

There are, of course, numerous post pullers adapted to be operatively connected with a farm vehicle now on the market, but the majority of these units necessitate the employment of chains and the like and, as a consequence, require the use of at least two men to install the equipment and to effectively operate the puller. By virtue of the rather complex nature of the present equipment, the manufacturing cost is comparatively high and, in addition, the owner is faced with numerous maintenance or repair problems.

Accordingly, an important object of my invention is to provide a relatively simple pulling assembly which may be easily and quickly attached to a farm vehicle, such as a tractor, at either the front or rear thereof by one person.

A further object of the invention is to provide a post puller which is provided with adjustable gripping jaws or blades, which jaws or blades may be adjusted to compensate for the particular size of post to be pulled with a minimum of effort on the part of the user.

Yet a further object of my invention is to provide a post puller wherein the adjustable jaws are provided with a removable blade which is adapted to bite or cut into the post, the blades being so mounted that the post will not be severely damaged during the pulling process.

Still another object of my invention is to provide a post puller adapted to be attached to a tractor or the like which includes few principal working parts, thereby enabling the device to be easily manufactured at a reasonable price and which can be repaired in the event of damage, without the necessity of employing skilled labor.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which:

Figure 1 is a top plan view of my invention attached to the rear of a tractor, the pulling jaws or blades being illustrated in the operative position.

Figure 2 is an end view of one of the pulling jaws illustrating the mode of attachment of the cutting blade, and Figure 3 is a rear elevational view of a tractor equipped with the pulling attachment.

Referring to Figure 1 I have indicated my post pulling assembly generally 10, and a tractor to the rear of which the assembly is attached is indicated generally 11. The tractor 11, as previously pointed out, is of conventional construction, and only those parts of the tractor which are necessary to fully understand the construction and operation of the puller will be described.

The tractor is provided with drawbar side irons 12, the inner ends of which are pivotally mounted to the tractor frame, and a connection 13 extends between each of the side irons and arms 14 associated with the power lifting mechanism (not shown) on the tractor. A transversely extending bar 15 is provided at each end thereof with a substantially U-shaped clamp 16, the clamps being adapted to be attached to the side irons 12 immediately forward of the point of attachment of the connections 13 to the side irons. A plate 17 is suitably attached to the bar 15 intermediate the ends thereof, and a pair of angle irons 18 are pivotally connected to the plate at their inner ends by means of a nut and bolt device 19. A crossbar 20 provided with a plurality of equi-distantly spaced apertures 21 is detachably connected to the outer ends of the side irons 12, as indicated at 22, and the crossbar 20 is in the same plane as the plate 17, and it can be seen that the angle irons 18 are adapted to be in facial contact with the crossbar 20. The irons 18 may be secured in the desired angular relationship by inserting a suitable locking device 23 through an aperture in the horizontal flange of the iron and the desired aperture 21 in the crossbar. This locking unit 23 is preferably a bolt and nut structure, but, of course, other types of devices may be employed.

A cutting blade 24 having a beveled outer cutting edge 25 is secured to the horizontal flange of each angle iron 18 adjacent the outer ends thereof by a removable securing device, such as a nut and bolt combination 26. The outer edge of each blade 24 extends beyond the horizontal flange of the iron 18 a sufficient distance to permit the blade to bite into the post, but damage to the post is prevented since the horizontal flange of the angle iron stops the cutting edge from imbedding too deeply into the post. If desired, the blade 24 may be raised above the flange of the iron 18 by welding an iron strip to the flange and securing the blade to the upper face of the strip (not shown).

Two lengths of chain 27 may be secured to the bar 15 and tractor 11, as shown in Figure 1, to limit downward movement of the puller attachment.

While the operation of the post puller is thought to be readily apparent from the above description, it may be briefly summarized as follows:

The bar 15 and the angle irons 18 are attached to the drawbar side irons 12 by means of the clamps 16. The locking devices 23 are then inserted through the proper apertures 21 in order that the blades 24 will engage the post to be pulled. The locking devices are then manipulated to secure the angle irons in position and the tractor is moved rearwardly until the blades 24 dig into the post. The lifting mechanism is then activated and the side irons 12 are moved upwardly about their pivots together with the angle irons 18, and the post is thus "pulled out" of the ground. Hence, it can be seen that the apparatus can be very easily operated by the driver of the tractor and it requires very little time to place the unit into condition for operation. After the post has been removed from the ground, the locking devices 23 are removed to permit the angle irons 18 to be swung away from the post and the apparatus is now ready for further use. By reason of the adjustability of the angle irons 18, the puller may be effectively used with posts, brush and the like of various diameters and the desired adjustability can be made in a minimum of time. Furthermore, the blade structure 24 and its mode of attachment to the irons 18 will give a "grabbing" action to the blades which will grip the posts and brush firmly, and the blades cannot injure the posts materially since the horizontal flange of each of the irons will limit the cutting action of the blades.

While the foregoing description has been directed primarily to attaching the puller at the rear of the tractor, it can, of course, be employed at the front of a tractor or manure loader by securing the clamps 16 to the desired structural parts at the front of the equipment. Of course where the attachment is located at the front, the vehicle is moved forwardly to engage the post rather than rearwardly.

It will be appreciated that I have provided a simply constructed post puller or brush grubber that may be readily and quickly connected to conventional power farm equipment by one man. The adjustability of the engaging jaws enables the unit to be readily adapted to any size post desired to be pulled, which adjustment can be easily made. The device is quite sturdy and any damaged or broken parts may be inexpensively replaced.

The invention is not to be confined to any strict conformity with the showing in the drawing, but may be changed or modified so long as such changes or modifications mark no material departure from the salient features of the invention as expressed in the appended claims.

I claim:

1. A post puller adapted to be attached to a power driven vehicle having a lifting mechanism, pivotally mounted supporting members extending rearwardly of the tractor in parallel relationship and a connection between the lifting mechanism and the supporting members to move said members about their pivots comprising a transversely extending bar adapted to be detachably secured to said supporting members, a pair of arms pivotally connected to the said transverse bar for movement about a vertical axis toward and away from each other and extending longitudinally from said bar, a blade secured to each of the said arms adjacent the free end of each arm with the cutting edge of each of the blades extending beyond the edge of each of the arms, a second bar extending between the supporting members in spaced parallel relation to the first named bar, said second bar having a plurality of spaced apertures therein and a locking device cooperating with one of said apertures and the bar to secure the arms to the second bar in the desired position.

2. A post puller adapted to be attached to a power driven vehicle having a lifting mechanism, pivotally mounted side bars extending rearwardly of the tractor in parallel relationship and a connection between each of said side bars and the lifting mechanism to move the side bars about their point of pivot, a transverse strap having a clamp at each end for attachment to said side bars, a plate on said strap extending forwardly thereof, a pair of angle irons pivotally connected at their inner ends to the said plate for movement about a vertical axis toward and away from each other and extending longitudinally from the plate, a second strap extending between said side bars forwardly of and in parallel relationship to the first mentioned strap, said second mentioned strap having a plurality of spaced apertures therein, a securing device associated with each of said angle irons and said second named strap to secure the said angle irons to the second named strap in the desired angular position, and a cutting blade secured to the horizontal flange of each angle iron adjacent the outer end thereof with the cutting edge of the blade extending beyond the edge of the horizontal flange.

HOWARD D. FOUNTAIN.

References Cited in the file of this patent

UNITED STATES PATENTS

| Number | Name | Date |
| --- | --- | --- |
| 1,381,592 | Price | June 14, 1921 |
| 1,976,160 | Coplen | Oct. 9, 1934 |
| 2,482,950 | Tofty | Sept. 27, 1939 |
| 2,505,923 | Taylor et al. | May 2, 1950 |
| 2,535,054 | Ernst et al. | Dec. 26, 1950 |
| 2,553,077 | Braun | May 15, 1951 |